United States Patent
Aigami et al.

[11] 3,906,044
[45] Sept. 16, 1975

[54] ADAMANTYLAMIDINES AND PROCESSES FOR MAKING THEM

[75] Inventors: Koji Aigami; Yoshiaki Inamoto, both of Wakayama, Japan

[73] Assignee: Kao Soap Co., Ltd., Tokyo, Japan

[22] Filed: Oct. 16, 1974

[21] Appl. No.: 515,429

[30] Foreign Application Priority Data
Oct. 19, 1973 Japan............................ 48-117457

[52] U.S. Cl..... 260/564 R; 260/453 R; 260/501.14; 424/316; 424/326
[51] Int. Cl.².................................... C07C 123/00
[58] Field of Search.................... 260/564 R, 501.14

[56] References Cited
UNITED STATES PATENTS
3,732,305   5/1973   Bauer............................ 260/564 R FOREIGN PATENTS OR APPLICATIONS
448,469      1936   United Kingdom............ 260/564 R OTHER PUBLICATIONS
Shriner, Chem. Reviews, Vol. 35, pp. 354–359 (1944).

*Primary Examiner*—Gerald A. Schwartz
*Attorney, Agent, or Firm*—Woodhams, Blanchard and Flynn

[57] ABSTRACT

Adamantyl amidines having the following formula (I) and their acid addition salts:

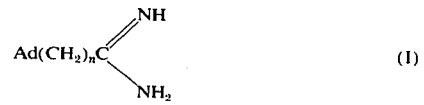

wherein Ad is adamantyl or bridgehead carbon atom-substituted alkyladamantyl, $n$ is 0 or 1, and the amidino or amidinomethyl group is attached to a bridgehead carbon atom of the adamantane ring.

The compounds are prepared by (1) reacting said nitrile compounds in the anhydrous state with an alcohol and an acid and then reacting the product with ammonia, or (2) reacting the corresponding nitrile compounds with a metal amide. The compounds are useful as anti-viral agents and as intermediates of adamantyl-substituted heterocyclic compounds.

4 Claims, No Drawings

ADAMANTYLAMIDINES AND PROCESSES FOR MAKING THEM

BACKGROUND OF THE INVENTION

1. Field of the Invention

This invention relates to adamantylamidines and processes for preparing them.

2. Summary of the Invention

The invention provides adamantylamidines having the formula (I) and their acid addition salts:

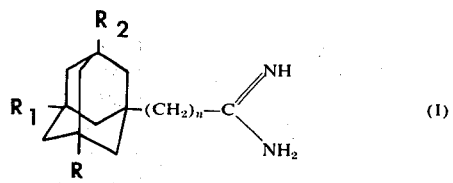

(I)

wherein R, $R_1$ and $R_2$, which can be the same or different, are hydrogen or alkyl having from 1 to 4 carbon atoms, and $n$ is 0 or 1.

Compounds of the formula (I) have anti-viral activities. Further, they are very valuable as intermediates for synthesizing adamantyl-substituted heterocyclic compounds such as pyrimidines.

We have discovered that when nitriles having the formula (II) given below are reacted, either (1) in the anhydrous state with a lower alcohol and an acid and then with ammonia, or (2) with an alkali metal amide, and then the reaction product of (2) is hydrolyzed, there are obtained adamantylamidines of the formula (I).

Thus, in accordance with this invention, there is provided processes in which amidine derivatives having the above formula (I) and their acid addition salts, i.e., salts of pharmaceutically acceptable acids can be prepared readily and advantageously by the reaction of a known nitrile having the formula (II):

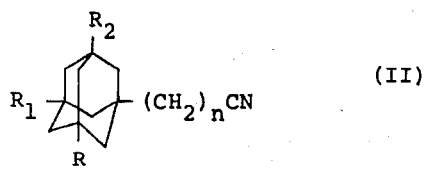

(II)

wherein R, $R_1$, $R_2$ and, n have the same meanings as defined above,
with either (1) a lower alkanol in the presence of an acid, and then with ammonia, or (2) with an alkali metal amide, and then hydrolyzing the reaction product of (2).

The processes of this invention can be performed simply and advantageously.

First, an imino-ether is prepared from the formula II compound by introducing an acid into a mixture of a nitrile having the above general formula (II) and a lower alcohol (e.g. on alkanol of 1 to 6 carbon atoms) in the anhydrous state, i.e. under anhydrous conditions, at temperatures as described below.

A hydrogen halide, especially hydrogen chloride, is generally used as the acid for this reaction, but any acid, preferably a mineral acid such as sulfuric acid, sulfonic acid and the like also be employed effectively.

As the lower alcohol, there are preferably employed methanol, ethanol, n-propanol, i-propanol, n-butanol, i-butanol and sec-butanol. A stoichiometric amount of the lower alcohol, based on the nitrile, is sufficient for the reaction but no bad effects occur if an excess of the lower alcohol is used.

The reaction temperature is within the range of from 0° to 100°C., preferably from 0° to 50°C. The product of this reaction is an imino-ether in which the R of the —OR ether moiety corresponds to the alcohol used in the reaction.

Then, the imino-ether thus-obtained is dissolved in a lower alcohol of the above kind and is reacted with ammonia. The temperature for this subsequent reaction is within the range of from 20° to 100°C., preferably from 30° to 60°C.

Amidines (I) can also be prepared in one step by the following method.

The nitrile of the formula (II) is reacted with an alkali metal amide such as sodium amide or potassium amide, under anhydrous conditions, in an anhydrous organic solvent inert to the reaction such as benzene, toluene, xylene, anisole and biphenyl, or in liquid ammonia, and then the resulting reaction product is hydrolyzed. The reaction temperature is within the range of from −30° to 150°C., preferably from 10° to 80°C.

The starting compounds of formula II are known compounds or they can be prepared by conventional processes.

Amidine derivatives (I) obtained by either process can readily be converted to desired salts by anion exchange or by neutralization in a conventional manner. The acid addition salts of the amidine derivatives (I) obtained according to the process of this invention includes salts of organic as well as inorganic acids. For example, hydrochloric acid, sulfuric acid, thiosulfuric acid, p-toluenesulfonic acid, oxalic acid, citric acid and phosphoric acid can be used for the preparation of such acid addition salts.

The compounds of the formula I and their acid addition salts exhibit anti-viral activities against new castle disease virus (NDV) in an in vitro test using a chick embryo monolayer tissue culture.

This invention will now be further described by reference to the following illustrative Examples.

EXAMPLE 1

Two-and-one-half grams of adamantylacetonitrile was dissolved in 30 ml. of anhydrous ethanol and the solution was maintained at 5°C. by external cooling with ice. Hydrogen chloride was bubbled into the solution at a rate of 60 ml./min. for 2 hours, and the reaction mixture was set aside at room temperature for 3 days. Then, dry nitrogen was blown into the reaction mixture to expel any excess hydrogen chloride remaining in the reaction mixture.

After the addition of 20 ml. of anhydrous ethanol the mixture was heated to 50°C. and ammonia gas was introduced into the mixture at a rate of 60 ml./min. for 2 hours. The precipitate was filtered off from the cooled reaction mixture and the filtrate was concentrated under reduced pressure to give 1.74 grams of adamantylacetamidine hydrochloride in the form of colorless crystals.

Elemental Analysis Found : C, 63.1; H, 8.7; N, 12.0; Cl, 16.1%. Calculated for $C_{11}H_{19}N_2Cl$ : C, 63.56; H, 8.45; N, 12.35; Cl, 15.64%. Melting Point: above 300°C.

IR Spectrum (Kbr, $cm^{-1}$) 3320 (VS), 3130 (VS), $\nu_{N-H}$ 2900 (VS), 2850 (VS), $\nu_{C-H}$ 1680 (VS), $\nu_{N=C}$

EXAMPLE 2

Eight and six-tenths grams of adamantylacetonitrile was dissolved in 80 ml. of anhydrous benzene, and 2.0 grams of finely powdered sodium amide was added in small portions to the solution. Then, the mixture was heated under reflux for 6 hours. After completion of the reaction, the reaction mixture was added dropwise under vigorous stirring into ice water containing sulfuric acid (5%) to precipitate colorless crystals. The crystals were recovered by filtration, washed with water and dried under reduced pressure to give 3.2 grams of adamantylacetamidine sulfate.

Elemental Analysis Found : C, 59.5; H, 8.6; N, 11.9; S, 6.9. Calculated for $C_{22}H_{38}N_4SO_4$ : C, 59.72; H, 8.77; N, 11.61; S, 6.64. Melting Point: above 300°C.

IR Spectrum (Nujol, $cm^{-1}$) 3250 (S), 3020 (S), $\nu_{N-H}$ 1690 (S), $\nu C=N$ 1090 (S), 1065 (S)

EXAMPLE 3

One gram of the adamantylacetamidine hydrochloride obtained in Example 1 was dissolved in 10 ml. of 10% ethanol, and 10 ml. of a 10% aqueous solution of sodium thiosulfate was added dropwise to the above solution to precipitate colorless crystals. The crystals were recovered by filtration, washed with water and dried under reduced pressure to give 1.0 gram of adamantylacetamidine thiosulfate.

Elemental Analysis Found : C, 57.6; H, 8.3; N, 11.4; S, 13.1. Calculated for $C_{22}H_{38}N_4S_2O_4$ : C, 57.80; H, 8.49; N, 11.23; S, 12.86. Melting Point 265°–270°C. (decomposition)

IR Spectrum (Nujol, $cm^{-1}$) 3250 (S), 3040 (S), $\nu_{N-H}$ 1680 (VS), $\nu_{N=C}$ 1130 (VS), 1110 (VS), 1080 (VS), 1010 (VS)

EXAMPLE 4

The anti-viral activity of adamantylacetamidine hydrochloride prepared in Example 1 was tested against new castle disease virus (NDV) in an in vitro test using chick embryo monolayer tissue culture as follows.

A chick embryo monolayer tissue culture was mixed with NDV solution having a concentration of 128 hemagglutinin aggregation units and with an aqueous solution of a specified concentration of adamantylacetamidine hydrochloride in the culture, and then cultured at 37° for 48 hours. The concentration of the replicated virus in the resulting tissue culture was determined by a hemagglutination reaction.

| Concentration of Adamantylacetamidine Hydrochloride in starting culture (μg/ml) | % Inhibition of NDV multiplication * |
|---|---|
| 500 | > 95 |
| 250 | > 95 |
| 100 | 60 |
| 50 | 0 |

* Relative to the control experiment in which no adamantylacetamidine hydrochloride was added.

Thus the virus replication in the tissue culture containing above 250 g/ml. of adamantylacetamidine hydrochloride was almost completely inhibited.

The compounds of formula I and their acid addition salts have been found to possess valuable anti-viral properties and are useful in combating virus and virus-related diseases in humans and valuable domestic animals. The novel compounds, I and their addition salts also have valuable anti-viral activity in vitro, and can be utilized thus for many purposes related to this in vitro anti-infective quality.

The methods of administration and dosages employed in using compound I and its acid addition salts are those conventionally used with anti-viral substances, and the details can readily be discerned and determined by those familiar in the field.

The embodiments of the invention in which an exclusive property or privilege is claimed are defined as follows:

1. A compound having the formula

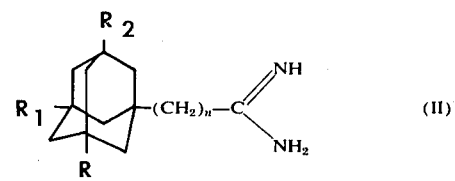

wherein R, $R_1$ and $R_2$, which are the same or different, are hydrogen or alkyl of one to 4 carbon atoms, and $n$ is 0 or 1; or a salt thereof with a pharmaceutically acceptable acid.

2. A compound according to claim 1, adamantylacetamidine hydrochloride.

3. A compound according to claim 1, adamantylacetamidine sulfate.

4. A compound according to claim 1, adamantylacetamidine thiosulfate.

* * * * *